United States Patent [19]

Aoki et al.

[11] Patent Number: 5,264,490

[45] Date of Patent: Nov. 23, 1993

[54] PARTICULATE POLYBUTADIENE CROSSLINKED MATERIAL

[75] Inventors: Nobuo Aoki; Shinichiro Suzuki; Mitsuo Matsuno, all of Yokohama, Japan

[73] Assignee: Nippon Oil Co., Ltd., Tokyo, Japan

[21] Appl. No.: 776,996

[22] Filed: Oct. 16, 1991

[30] Foreign Application Priority Data

Oct. 19, 1990 [JP] Japan ................... 2-281315

[51] Int. Cl.⁵ .............................. C08L 47/00
[52] U.S. Cl. .................... 525/105; 528/25; 525/100; 428/402; 428/407
[58] Field of Search .............. 525/105, 479; 528/25; 524/269, 731; 428/402, 407

[56] References Cited

U.S. PATENT DOCUMENTS

| | | |
|---|---|---|
| 2,867,603 | 1/1959 | Safford et al. |
| 3,288,879 | 11/1966 | Stafford .............. 525/105 |
| 3,433,760 | 3/1969 | Clark et al. ............ 525/105 |
| 4,341,675 | 7/1982 | Nakamura ............ 525/105 |

FOREIGN PATENT DOCUMENTS

| | | |
|---|---|---|
| 0450983 | 9/1991 | European Pat. Off. |
| 54-024955 | 2/1979 | Japan. |
| 974146 | 11/1964 | United Kingdom. |

*Primary Examiner*—Ralph H. Dean
*Attorney, Agent, or Firm*—Bucknam and Archer

[57] ABSTRACT

A particulate polybutadiene crosslinked material is disclosed along with a process of making the same. The particulate material has a substantially spherical, uniformly shaped configuration and comprises at least part of its surface layer occupied by a reaction product of polybutadiene and a silicone compound.

14 Claims, No Drawings

PARTICULATE POLYBUTADIENE CROSSLINKED MATERIAL

BACKGROUND OF THE INVENTION

1. Field of the Invention

This invention relates to particulate polybutadiene crosslinked materials and a process of making the same. The particulate crosslinked product of the invention finds extensive application as blends with resinous materials used in machineries and electronics industries, as solid lubricating agents added to greases and lubricating oils, as anti-friction improvers for paints and inks and further as cosmetics blends.

2. Prior Art

Polybutadiene crosslinked particles are widely recognized for their high strength, high thermal resistance, low dielectric constant and low moisture-absorption characteristics, and are usually made available by mechanically pulverizing their initial massive crosslinked material.

However, such crosslinked particles are susceptible to discoloration upon exposure to ultraviolet rays and hence find limited commercial application. They are not suitable for outdoor application as they undergo abrupt discoloration from white to brown when exposed to sunlight. Mechanical pulverization of a massive or cloddish polybutadiene crosslinked material involves a difficulty in removing polymerization heat generated during its preparation and further in obtaining uniformly minute and regularly shaped particles at high yield. Emulsification crosslinking methods are also known and effective in so far as concerns the removal of polymerization heat, but not satisfactory in that the particles are liable to become coagulated or cohesive during crosslinking and fail to grow sufficiently minute.

SUMMARY OF THE INVENTION

It has now been found by the present inventors that polybutadiene crosslinked material in the form of a truly spherical particulate form can be obtained at high yield by subjecting a polybutadiene to crosslinking reaction with stirring in the presence of a silicone compound and surprisingly that the resulting crosslinked particles retain highly concentrated silicone chemically bonded to their surface layer whereby discoloration by ultraviolet rays is reduced to an absolute minimum as compared to conventional counterparts.

It is therefore a primary object of the present invention to provide a process of preparing a high yield of particulate polybutadiene crosslinked material which possesses excellent properties including high mechanical strength, high thermal resistance, low dielectric constant and low moisture-absorption, and in addition thereto, a substantial freedom of discoloration by ultraviolet radiation.

Another object of the invention is to provide particulate polybutadiene crosslinked material of the above mentioned character which further presents a substantially truly spherical and regularly shaped configuration and a relatively low particle size distribution.

These and other objects, features and advantages of the invention will appear manifest upon reading the following detailed description.

DETAILED DESCRIPTION OF THE INVENTION

The polybutadiene used in the invention may be obtained by subjecting a butadiene to one of many known polymerization reactions such as anionic polymerization using Na dispersant or organo-alkali metal catalyst, a radical polymerization (with organic peroxide catalyst), a cationic polymerization (with Friedel-Craft catalyst), and a coordination anionic polymerization (with Ziegler catalyst).

Generally, polybutadienes contain vinyl double bonds as well as main chain (trans and cis) double bonds. A polybutadiene eligible for the purpose of the invention contains usually more than 5 mol percent, preferably 10–100 mol percent, more preferably 30–100 mol percent of vinyl double bonds based on monomer unit and has a number average molecular weight usually in the range of 500–100,000 and preferably in the range of 1,000–20,000. The polybutadiene may be a butadiene homopolymer or a copolymer having monomers other than butadiene introduced into the polymer skeleton, in which instance the comonomers may be styrene and alpha-methylstyrene and is present in a unit amount of 20 mol percent or less, preferably 0–15 mol percent.

The polybutadiene may be modified, if necessary, with acids or peroxides to introduce hydroxide or carboxyl groups into the polymer. Such modified polymers include for example a polybutadiene added with maleic acid anhydride and a polymer having emulsified carbon-carbon double bonds, in which instance the reactive groups introduced into the polymer is present in an amount of usually 20 mol percent or less, preferably 0–15 mol percent based on butadiene unit.

The inventive product is produced by crosslinking the above described polybutadienes in the presence of a silicone compound according to a radical crosslinking, a cationic crosslinking or an anionic crosslinking process. In the case of radical crosslinking, the reaction can be initiated by some air dissolved in a liquid silicone compound, but more effectively by the use of a suitable radical initiator such as organic peroxides including methylethyl ketone peroxide, 1,1-bis(t-butyl peroxy)-3,3,5-trimethyl cyclohexane, t-butylhydroperoxide, dicumyl peroxide and 2,5-di(t-butyl peroxide)hexene-3, or aromatic hydrocarbons including 2,3-dimethyl-2,3-diphenyl butane and 2,3-diethyl-2,3-diethyl butane. These initiators may be used in combination and are used in an amount of usually 0.01–10 parts by weight, preferably 0.05–5 parts by weight per 100 weight parts of polybutadiene.

The radical crosslinking reaction is effected at a temperature of usually 100°–350° C., preferably 150°–320° C., more preferably 220°–300° C., though dependent upon decomposition temperature of the radical initiator used.

The term silicone compound as used herein designates a compound having a main chain consisting of repetitive units of siloxane bonds. Such a compound is eligible for the purpose of the invention if it is liquid at the above specified crosslinking temperature. Preferred examples of such compounds include dimethyl silicone, methylphenyl silicone, methyl trifluoropropyl silicone, methylhydrogene silicone and alkyl-modified silicone. Polyether-modified silicone, alcohol-modified silicone and carboxyl-modified silicone may be also exemplified.

According to an advantage of the invention, the particle size of a crosslinked particulate product to be obtained can be effectively controlled by the viscosity of the silicone compound which is in terms of dynamic viscosity at 25° C. usually 1-1,000,000 centistokes (cSt), preferably 10-100,000 cSt, more preferably 100-10,000 cSt. The above exemplified silicone compounds may be combined in use if necessary.

Any of the silicone compounds according to the invention is used in an amount of usually 1-100 parts by weight, preferably 4-20 parts by weight per 1 weight part of polybutadiene.

The crosslinking reaction contemplated hereunder is carried out for a time length of usually 5 minutes to 10 hours, preferably 10 minutes to 5 hours with stirring usually at 50-10,000 rpm, preferably 100-5,000 rpm.

There may be added certain polymers or monomers which are not detrimental to the results of the invention, examples of which polymers include polymethyl methacrylate and polystyrene. These polymers may be added in an amount of usually less than 20 parts by weight, preferably 0-15 parts by weight per 100 parts by weight of polybutadiene. Examples of the monomers that may be admixed include styrene, methyl methacrylate, 2-ethylhexyl acrylate, hexandiol diacrylate, trimethylolpropane triacrylate, trimethylolpropane trimethacrylate, pentaerythritol triacrylate, pentaerythritol trimethacrylate, triallyl isocyanurate and triallyl cyanurate. These monomers may be added in an amount of usually less than 20 parts by weight, preferably less than 15 parts by weight per 100 parts by weight of polybutadiene.

The particulate material resulting from the aforesaid crosslinking reaction comprises at least part of its surface region occupied by a reaction product of polymer and silicone compound. A surface layer of the crosslinked particulate material measuring about 20 angstroms in depth was examined by X-ray photoelectronic spectral analysis to reveal the presence of silicone compound in an amount of generally more than 20 weight %, preferably more 40 weight %, more preferably more than 60 weight % of the total surface layer.

The particle size of the crosslinked material ranges usually between 0.01 and 1,000 microns, preferably between 0.02 and 500 microns, more preferably between 0.05 and 200 microns. Less than 0.01 micron particle sizes would lead to secondary coagulation of the particles. Conversely, larger particle sizes than 1,000 microns would fail in uniform distribution of the particles when admixed with other materials.

The invention will be further described by way of the following examples.

INVENTIVE EXAMPLE 1

To 100 parts by weight of liquid polybutadiene having a number average molecular weight of 2,000 and 65 mol percent of vinyl double bonds (tradenamed Nisseki Polybutadiene B-2000 manufactured by Nippon Petrochemicals Co., Ltd.) were added 1.0 parts by weight of each of 2,5-di(t-butylperoxy)hexene-3 and 2,3-dimethyl-2,3-diphenyl butane which were uniformly dissolved. 10 grams of the resulting admixture or starting crosslinking material together with 190 grams of dimethyl silicone having a dynamic viscosity of 1,000 cSt at 25° C. (tradenamed KF-96 manufactured by Shinetsu Chemicals Co., Ltd.) were charged into a 500 ml reactor equipped with stirrer. The reactor temperature was gradually raised from room temperature to 290° C. with a stirring speed held at 500 rpm and maintained at 290° C. for three consecutive hours to effect crosslinking of the admixture. The reaction liquid was removed from the reactor and found to show a dispersion of particles. The liquid was centrifugally processed to recover the particles which were thereafter washed with xylene and filtered. The resulting white crosslinked particles were thus recovered at a yield of 81 weight % based on the starting crosslinking material. The particles when observed by a scanning type electron microscope presented a truly spherical form having an average size of about 5 μm.

A surface layer measuring about 20 angstroms deep of the crosslinked particulate product was analyzed by X-ray photoelectron spectral method (XPS) to reveal the presence of a silicone compound concentration corresponding in terms of dimethyl silicone to about 91 weight % of the total surface layer measured.

The particulate product was further exposed through an alumina sheet to 160 mW/cm radiation by high-pressure mercury lamp, with the results shown in Table 1.

INVENTIVE EXAMPLE 2

The procedure of Inventive Example 1 was followed with the exception that methylphenyl silicone (tradenamed KF-54 manufactured by Shinetsu Chemicals Co., Ltd.) having a dynamic viscosity of 400 cSt at 25° C. was used in place of dimethyl silicone. There was obtained a white spherical particulate crosslinked product having a particle size of 11 μm and at a yield of 78 weight % based on the starting crosslinking material. Analysis of the crosslinked product showed a silicone compound concentration in its surface layer corresponding in terms of methylphenyl silicone to about 79 weight % of the total surface layer measured. The results of ultraviolet radiation test are shown in Table 1.

INVENTIVE EXAMPLE 3

To 100 parts by weight of liquid polybutadiene having a number average molecular weight of 3,000 and 65 mol percent of vinyl double bonds (tradenamed Nisseki Polybutadiene B-3000 manufactured by Nippon Petrochemicals Co., Ltd.) were added 1.0 parts by weight of each of 2,5-di(t-butylperoxy)hexene-3 and 2,3-dimethyl-2,3-diphenyl butane which were uniformly dissolved. 20 grams of the resulting admixture or starting crosslinking material together with 180 grams of methyltrifluoropropyl silicone having a dynamic viscosity of 10,000 cSt at 25° C. (tradenamed FL-100 manufactured by Shinetsu Chemicals Co., Ltd.) were charged into a 500 ml reactor equipped with stirrer. The reactor temperature was gradually raised from room temperature to 280° C. with a stirring speed held at 500 rpm and maintained at 280° C. for three consecutive hours to effect crosslinking of the admixture. The reaction liquid was removed from the reactor and was centrifugally processed to recover the particles which were thereafter washed with xylene and filtered. There was obtained a white spherical crosslinked particulate product at a yield of 84 weight % based on the starting crosslinking material. The particles when observed by a scanning type electron microscope presented a truly spherical form having an average size of about 10 μm.

Analysis showed the presence of a silicone compound concentration corresponding in terms of methyltrifluoropropyl silicone to about 93 weight % of the total surface layer measured.

The particulate product was tested as in Inventive Example 1 by ultraviolet radiation with the results shown in Table 1.

COMPARATIVE EXAMPLE 1

The starting crosslinking material used in Inventive Example 1 was alone charged into a brass mold and then transferred to and stored in a constant temperature bath at 290° C. for three consecutive hours. There was obtained a sheet of crosslinked resin, which was thereafter pulverized by a shock-type ultrafine grinder to an average particle size of 42 μm. The resulting particulate product was further classified thereby producing a white irregularly shaped particulate material having an average particle size of 23 μm. The yield of the thus classified particles was 16%. Ultraviolet radiation test as in Inventive Example 1 was conducted with the results shown in Table 1.

TABLE 1

|  | Yield (weight) | Color change of particles | |
|---|---|---|---|
|  |  | before radiation | after radiation |
| Inventive Example 1 | 81 | white | white |
| Inventive Example 2 | 79 | white | white |
| Inventive Example 3 | 84 | white | white |
| Comparative Example 1 | 16 | white | dark brown |

What is claimed is:

1. A process of making a particulate polybutadiene crosslinked material which consists of dispersing a polybutadiene feed containing 5–00 mol percent of vinyl double bonds based on the butadiene monomer and having a number average molecular weight of 1,000-20,000 in a liquid silicone compound, crosslinking said polybutadiene, centrifuging the dispersed product to separate the liquid from the solid particles, and recovering from the solid particles said polybutadiene crosslinked material containing on its surface a reaction product of polybutadiene and said silicon compound.

2. A process according to claim 1, wherein said silicone compound is selected from the group consisting of dimethyl silicone, methylphenyl silicone, methyl trifluoropropyl silicone, methyl hydrogen silicone, a silicone containing an ether group, a silicone containing a hydroxy group and a silicone containing a carboxy group.

3. A process according to claim 1 wherein said crosslinking reaction is effected further in the presence of a radical initiator.

4. A process according to claim 1 wherein said silicone compound is used in an amount of 4-20 parts per weight per 1 part by weight of said polybutadiene.

5. The process according to claim 1 wherein said polybutadiene feed has 30-100 mol percent of vinyl double bonds.

6. The process according to claim 1 wherein said polybutadiene feed is a butadiene copolymer.

7. The process according to claim 6 wherein said butadiene copolymer is a copolymer of butadiene and styrene or alpha-methylstyrene, said styrene or alpha-methylstyrene being in an amount up to 20 mol percent based on butadiene monomer.

8. The process according to claim 1 wherein said crosslinking is a radical crosslinking at a temperature of 100°-350° C.

9. The process according to claim 1 wherein said silicone compound has a viscosity of 1-1,000,000 centistokes 10. A particulate polybutadiene crosslinked material comprising substantially truly spherical particles each having at least part of their surface layer consisting of a reaction product of polybutadiene and a silicone compound.

11. A particulate polybutadiene crosslinked material according to claim 10 wherein said silicone compound is selected from the group consisting of dimethyl silicone, methylphenyl silicone, methyl trifluoropropyl silicone, methyl hydrogen silicone, a silicone containing an ether group, a silicone containing a hydroxy group and a silicone containing a carboxy group.

12. A particulate polybutadiene crosslinked material according to claim 10 wherein said particles have an average particle size of 0.02-500 microns.

13. The particulate polybutadiene crosslinked material according to claim 12 wherein said surface layer measures about 20 angstroms in depth.

14. The particulate polybutadiene crosslinked material according to claim 13 wherein said surface layer contains said silicone compound in an amount more than 20% by weight of the total surface layer, said silicone compound being at least one member selected from the group consisting of dimethyl silicone, methylphenyl silicone, methyl trifluoropropyl silicone, methyl hydrogen silicone, a silicone containing an ether group, a silicone containing a hydroxy group and a silicone containing a carboxy group.

* * * * *

UNITED STATES PATENT AND TRADEMARK OFFICE
CERTIFICATE OF CORRECTION

PATENT NO. : 5,264,490

DATED : November 23, 1993

INVENTOR(S) : Nobuo Aoki; Shinichiro Suzuki; Mitsuo Matsuno

It is certified that error appears in the above-identified patent and that said Letters Patent is hereby corrected as shown below:

Column 5, claim 1, line 30, "5-00 mol percent" should read --5-100 mol percent--

Signed and Sealed this

Fourteenth Day of June, 1994

*Attest:*

BRUCE LEHMAN

*Attesting Officer*     Commissioner of Patents and Trademarks